(12) United States Patent
Horikawa et al.

(10) Patent No.: US 8,632,104 B2
(45) Date of Patent: Jan. 21, 2014

(54) PIPE JOINT CONSTRUCTION

(75) Inventors: Go Horikawa, Sanda (JP); Fumiyoshi Miyazaki, Toride (JP)

(73) Assignees: Tokyo Metropolitan Government, Tokyo (JP); Taisei Kiko Co., Ltd., Osaka (JP)

( * ) Notice: Subject to any disclaimer, the term of this patent is extended or adjusted under 35 U.S.C. 154(b) by 367 days.

(21) Appl. No.: 11/795,397

(22) PCT Filed: Nov. 24, 2005

(86) PCT No.: PCT/JP2005/021541
§ 371 (c)(1),
(2), (4) Date: Apr. 21, 2008

(87) PCT Pub. No.: WO2006/077691
PCT Pub. Date: Jul. 27, 2006

(65) Prior Publication Data
US 2008/0258463 A1    Oct. 23, 2008

(30) Foreign Application Priority Data

Jan. 19, 2005  (JP) .................................. 2005-011925

(51) Int. Cl.
*F16L 21/02*    (2006.01)
(52) U.S. Cl.
USPC ............ 285/377; 285/362; 285/396; 285/402
(58) Field of Classification Search
USPC ......... 285/376, 377, 359, 360, 361, 362, 395, 285/396, 401, 402; 403/349
See application file for complete search history.

(56) References Cited

U.S. PATENT DOCUMENTS

| | | | | |
|---|---|---|---|---|
| 893,554 A | * | 7/1908 | St. Onge | 285/334.3 |
| 1,471,427 A | * | 10/1923 | Towle | 251/149.1 |
| 1,911,659 A | * | 5/1933 | Weaver | 277/622 |
| 2,376,566 A | | 5/1945 | Woodling | |
| 5,190,224 A | * | 3/1993 | Hamilton | 239/600 |
| 6,497,435 B1 | * | 12/2002 | Luft et al. | 285/360 |

FOREIGN PATENT DOCUMENTS

| | | |
|---|---|---|
| DE | 198 18 005 A1 | 11/1998 |
| DE | 201 20 145 U1 | 5/2002 |
| DE | 10161144 A1 * | 6/2003 |
| DE | 203 13 792 U1 | 12/2003 |
| FR | 423 919 A | 5/1911 |
| JP | 04-285386 | 10/1992 |
| JP | 09-144963 | 6/1997 |
| JP | 09-292074 | 11/1997 |
| JP | 09-303636 | 11/1997 |
| JP | 2001-263565 | 9/2001 |

* cited by examiner

*Primary Examiner* — Victor MacArthur
*Assistant Examiner* — Gwendolyn Driggers
(74) *Attorney, Agent, or Firm* — The Webb Law Firm

(57) ABSTRACT

A lock member capable of contacting an engaging projection of an inserted pipe section from a direction of the pipe axis and relatively rotatably attachable between an annular wall portion of a receiving pipe section and the engaging projection of the inserted pipe section includes engaging stopper portions projecting therefrom for contacting an inward surface of the annular wall portion from the direction of the pipe axis. The annular wall portion has attachment/detachment recesses formed therein for allowing inserting and removing movements of the engaging stopper portions in the direction of the pipe axis. An elastic urging member is provided between an extending portion projecting from the lock member to the outside of the pipe through an inner peripheral surface of the annular wall portion and the outer peripheral surface of the inserted pipe section, and an outward surface of the annular wall portion.

5 Claims, 8 Drawing Sheets

PIPE JOINT CONSTRUCTION

BACKGROUND OF THE INVENTION

1. Field of the Invention

The present invention relates to an improvement in a pipe joint construction for enhancing a separation preventive function between a receiving pipe section and an inserted pipe section inserted into and connected to the receiving pipe section from a direction of pipe axis, the pipe sections constituting part of a fluid pipeline system such as a water pipeline system or the like.

2. Description of Related Art

Conventionally, the following techniques have been known as pipe joint construction enhancing the separation preventive function between the receiving pipe section and the inserted pipe section.

(1) The receiving pipe section has, formed on/in inner peripheral surfaces thereof, an annular stopper wall portion for limiting a maximum inserted position (maximum contracting position) between the pipe sections by contacting, in a pipe axis direction, an annular engaging projection protruding from an outer peripheral surface of the inserted pipe section, and a mounting groove for receiving a substantially C-shaped lock member elastically deformable in a diameter-increasing direction.

Cam surfaces are formed on corners, opposing to each other in the pipe axis direction, of the engaging projection of the inserted pipe section and the lock member attached to the mounting groove, for elastically deforming the lock member in the diameter-increasing direction to an inside diameter allowing passage of the inserted pipe section as it is inserted into the receiving pipe section. (see Patent Document 1)

(2) A plurality of circumferential engaging projections protrude radially outward from an outer peripheral surface of the inserted pipe section inserted into and connected to the receiving pipe section from the direction of pipe axis. An annular wall portion is formed on an inner peripheral surface of the receiving pipe section for contacting, in the pipe axis direction, each engaging projection of the inserted pipe section placed in the inserted and connected position, thereby preventing relative disengaging movement of the pipe sections. The annular wall portion includes attachment/detachment recesses formed therein for allowing passage and movement of each engaging projection in the direction of pipe axis only when both the pipe sections are placed in a particular phase. (see Patent Documents 2 and 3)

Patent Document 1: Japanese Patent Publication No. 9-303636
Patent Document 2: Japanese Patent Publication No. 9-292074
Patent Document 3: Japanese Patent Publication No. 2001-263565

In the former conventional pipe joint construction noted above, the lock member mounted in the mounting groove in advance can be deformed by simply inserting the inserted pipe section into the receiving pipe section to increase the inside diameter for allowing passage of the engaging projection as the inserting operation proceeds. As a result, a desired separation preventive function can be performed by contact between the lock member on the side of the receiving pipe section and the engaging projection on the side of the inserted pipe section, while allowing the pipe sections to be connected easily and efficiently.

On the other hand, when a necessity arises to disassemble the pipe sections for maintenance and inspection or for changing of parts, the lock member must be expanded against the elastic force to the extent of allowing the engaging projection of the inserted pipe section to pass, by using a jig inserted through an annular space between the inner peripheral surface of the receiving pipe section and the outer peripheral surface of the inserted pipe section. This involves a great deal of labor and effort in the disassembling operation.

In the latter conventional pipe joint construction noted above, when connecting the receiving pipe section to the inserted pipe section, an adjustment is made for establishing the particular phase where the plurality of engaging projections of the inserted pipe section agree with the plurality of attachment/detachment recesses formed in the annular wall portion of the receiving pipe section. Both the pipe sections are moved toward each other in this state, thereby allowing each engaging projection of the inserted pipe section to pass through each attachment/detachment recess. Then, the pipe sections are rotated relative to each other about the pipe axis to a predetermined attachment position where each engaging projection placed in the attachment/detachment operating position corresponds to an inner surface of the annular wall portion.

Even if a withdrawing force is applied to both the pipe sections in this condition, the engaging projections contact the inner surface of the annular wall portion of the receiving pipe section from the direction of pipe axis, thereby preventing relative disengaging movement between the pipe sections.

Therefore, when necessity arises to disassemble the pipe sections, it is sufficient to rotate both the pipe section relative to each other from the predetermined attachment position to the attachment/detachment operating position and then relatively move and disengage the pipe sections along the direction of pipe axis. As a result, the pipe sections can be disassembled efficiently compared with the former pipe joint construction which requires that the jig is operated in the limited space within the receiving pipe section.

However, in assembling or disassembling the pipe sections, it is required to rotate the heavy pipe sections relative to each other from the attachment/detachment operating position to the predetermined attachment position, or from the predetermined attachment position to the attachment/detachment operating position. Such relative rotating operations disadvantageously requires a great deal of labor.

SUMMARY OF THE INVENTION

The present invention has been made having regard to the above state of the art, and its primary object is to provide a pipe joint construction for reliably performing a desired separation preventive function, while allowing the pipe sections to be assembled and disassembled efficiently and easily with reduced labor.

A first characteristic feature of the present invention for achieving the above-noted object lies in a pipe joint construction comprising an engaging projection formed in an outer peripheral surface of an inserted pipe section inserted into and connected to a receiving pipe section from a direction of pipe axis, to be capable of passing through an annular wall portion formed in a receiving opening side of the receiving pipe section to project radially inward; a lock member capable of contacting the engaging projection from the direction of pipe axis and relatively rotatably attachable between the annular wall portion of the receiving pipe section and the engaging projection of the inserted pipe section placed in an inserted and connected position, the lock member including engaging stopper portions projecting therefrom for contacting an inward surface of the annular wall portion of the receiving pipe section from the direction of pipe axis, thereby preventing relative disengaging movement between the connected pipe sections; attachment/detachment recesses formed in the annular wall portion of the receiving pipe section for allowing inserting and removing movements of the engaging stopper portions of the lock member in the direction of pipe axis; and an elastic urging member provided between an extending portion projecting from the lock member to the outside of the pipe through between an inner peripheral surface of the annular wall portion of the receiving pipe section and the outer peripheral surface of the inserted pipe section, and an outward surface of the annular wall portion of the receiving pipe section, for moving and urging the engaging stopper portions of the lock member rotated about the pipe axis from an attachment/detachment operating position corresponding to the attachment/detachment recesses to a predetermined attachment position toward a side to contact the inward surface of the annular wall portion of the receiving pipe section.

With the characteristic construction noted above, in connecting the receiving pipe section to the inserted pipe section, the engaging projection of the inserted pipe section is inserted to a predetermined connecting position in the receiving pipe section through the annular wall portion of the receiving pipe section. The lock member fitted on the inserted pipe section to be freely rotatable and movable in the direction of pipe axis is adjusted to establish a particular phase where the engaging stopper portions agree with the attachment/detachment recesses formed in the annular wall portion of the receiving pipe section in the direction of pipe axis. The lock member is pushed into the receiving pipe section in this state. Then, the engaging stopper portions of the lock member are moved through the attachment/detachment recesses and placed between the annular wall portion of the receiving pipe section and the engaging projection of the inserted pipe section placed in the inserted and connected position. Subsequently, the lock member is rotated about the pipe axis from the attachment/detachment operating position corresponding to the attachment/detachment recesses to the predetermined attachment position corresponding to the inward surface of the annular wall portion.

In this state, the engaging stopper portions of the lock member face the inward surface of the annular wall portion of the receiving pipe section in the direction of pipe axis. Therefore, when a removing force is applied to both the pipe sections due to an earthquake or unequal settlement, the engaging projection of the inserted pipe section contacts the lock member from the direction of the pipe axis. Further, the engaging stopper portions of the lock member contact the inward surface of the annular wall portion of the receiving pipe section from the direction of pipe axis, thereby strongly preventing relative separation movement between the pipe sections.

In addition, since the lock member includes an extending portion projecting to the outside of the pipe section through between the inner peripheral surface of the annular wall portion of the receiving pipe section and the outer peripheral surface of the inserted pipe section, the lock member can be readily rotated and moved in the direction of pipe axis from the outside of the pipe section by utilizing the extending portion. The elastic urging member is provided between the extending portion of the lock member and the outward surface of the annular wall portion, thereby allowing the engaging stopper portions of the lock member rotated to the predetermined attachment position to contact the inward surface of the annular wall portion by the elastic urging force of the elastic urging member. Therefore, the engaging stopper portions of the lock member are easily maintained in the predetermined attachment position even when an external force is applied.

Hence, the contact between the engaging projection of the inserted pipe section and the annular wall portion of the receiving pipe section through the lock member can reliably perform a strong separation preventive function, and at the same time the rotating operation of the lock member can switch between a locked state for preventing disengaging movement between the pipe sections and an unlocked state for allowing the removing and inserting movements between the pipe sections. Further, the lock member can be readily operated from the outside of the pipe through the extending portion thereof. As a result, the engaging and disengaging operations between the pipe sections can be carried out easily with reduced labor.

Moreover, the elastic urging member provided between the extending portion of the lock member and the outward surface of the annular wall portion of the receiving pipe section can maintain both the pipe sections in the predetermined attachment position for reliably achieving the function of strongly preventing separation of the pipe sections. Further, any clattering between the lock member and the receiving pipe section can be advantageously restrained.

A second characteristic feature of the present invention lies in a pipe joint construction comprising an engaging projection formed in an outer peripheral surface of an inserted pipe section inserted into and connected to a receiving pipe section from a direction of pipe axis, to be capable of passing through an annular wall portion formed in a receiving opening side of the receiving pipe section to project radially inward; a stopper wall portion formed on an inner peripheral surface of the receiving pipe section for contacting one side face of the engaging projection of the inserted pipe section from the direction of pipe axis, thereby limiting a maximum inserted position; a lock member capable of contacting the engaging projection of the inserted pipe section from the direction of pipe axis and relatively rotatably attachable between the annular wall portion of the receiving pipe section and the engaging projection of the inserted pipe section placed in an inserted and connected position, the lock member including engaging stopper portions projecting therefrom for contacting an inward surface of the annular wall portion of the receiving pipe section from the direction of pipe axis, thereby preventing relative disengaging movement between the connected pipe sections; attachment/detachment recesses formed in the annular wall portion of the receiving pipe section for allowing inserting and removing movements of the engaging stopper portions of the lock member in the direction of pipe axis; and an elastic urging member provided between the stopper wall portion of the receiving pipe section and the one side face of the engaging projection of the inserted pipe section, for moving and urging the engaging stopper portions of the lock member rotated about the pipe axis from an attachment/detachment operating position corresponding to the attachment/detachment recesses to a predetermined attachment position toward a side to contact the inward surface of the annular wall portion of the receiving pipe section.

According to the characteristic construction noted above, in connecting the receiving pipe section to the inserted pipe section, the engaging projection of the inserted pipe section is inserted to the predetermined connecting position in the receiving pipe section through the annular wall portion of the receiving pipe section. The lock member fitted on the inserted pipe section to be freely rotatable and movable in the direction of pipe axis is adjusted to establish the particular phase where the engaging stopper portions agree with the attachment/detachment recesses formed in the annular wall portion of the receiving pipe section in the direction of pipe axis. The lock member is pushed into the receiving pipe section in this state. Then, the engaging stopper portions of the lock member are moved through the attachment/detachment recesses and placed between the annular wall portion of the receiving pipe section and the engaging projection of the inserted pipe section placed in the inserted and connected position. Subsequently, the lock member is rotated about the pipe axis from the attachment/detachment operating position corresponding to the attachment/detachment recesses to the predetermined attachment position corresponding to the inward surface of the annular wall portion.

In this state, the engaging stopper portions of the lock member face the inward surface of the annular wall portion of the receiving pipe section in the direction of pipe axis. Therefore, when a removing force is applied to both the pipe sections due to an earthquake or unequal settlement, the engaging projection of the inserted pipe section contacts the lock member from the direction of the pipe axis. Further, the engaging stopper portions of the lock member contact the inward surface of the annular wall portion of the receiving pipe section from the direction of pipe axis, thereby strongly preventing relative separation movement between the pipe sections.

In addition, the elastic urging member is provided between the stopper wall portion formed in the inner peripheral surface of the receiving pipe section for limiting the maximum inserted position and the one side face of the engaging projection of the inserted pipe section, thereby allowing the engaging stopper portions of the lock member rotated to the predetermined attachment position to contact the inward surface of the annular wall portion by the elastic urging force of the elastic urging member. Therefore, the engaging stopper portions of the lock member are easily maintained in the predetermined attachment position even when an external force is applied.

Hence, the contact between the engaging projection of the inserted pipe section and the annular wall portion of the receiving pipe section through the lock member can reliably perform a strong separation preventive function, and at the same time the rotating operation of the lock member can switch between a locked state for preventing disengaging movement between the pipe sections and an unlocked state for allowing the removing and inserting movement between the pipe sections. Further, the engaging and disengaging operations between the pipe sections can be carried out easily with reduced labor.

Moreover, the elastic urging member provided between the stopper wall portion of the receiving pipe section and the one side of the engaging projection can maintain both the pipe sections in the predetermined attachment position for reliably achieving the function of strongly preventing separation of the pipe sections. Further, any clattering between the lock member and the receiving pipe section can be advantageously restrained.

A third characteristic feature of the present invention lies in a pipe joint construction comprising an engaging projection formed in an outer peripheral surface of an inserted pipe section inserted into and connected to a receiving pipe section from a direction of pipe axis, to be capable of passing through an annular wall portion formed in a receiving opening side of the receiving pipe section to project radially inward; a stopper wall portion formed on an inner peripheral surface of the receiving pipe section for contacting one side face of the engaging projection of the inserted pipe section from the direction of pipe axis, thereby limiting a maximum inserted position; a lock member capable of contacting the engaging projection of the inserted pipe section from the direction of pipe axis and relatively rotatably attachable between the annular wall portion of the receiving pipe section and the engaging projection of the inserted pipe section placed in an inserted and connected position, the lock member including engaging stopper portions projecting therefrom for contacting an inward surface of the annular wall portion of the receiving pipe section from the direction of pipe axis, thereby preventing relative disengaging movement between the connected pipe sections; attachment/detachment recesses formed in the annular wall portion of the receiving pipe section for allowing inserting and removing movements of the engaging stopper portions of the lock member in the direction of pipe axis; and elastic urging members provided between an extending portion projecting from the lock member to the outside of the pipe through between an inner peripheral surface of the annular wall portion of the receiving pipe section and the outer peripheral surface of the inserted pipe section, and an outward surface of the annular wall portion of the receiving pipe section, and provided between the stopper wall portion of the receiving pipe section and the one side face of the engaging projection of the inserted pipe section, respectively, for moving and urging the engaging stopper portions of the lock member rotated about the pipe axis from an attachment/detachment operating position corresponding to the attachment/detachment recesses to a predetermined attachment position toward a side to contact the inward surface of the annular wall portion of the receiving pipe section.

According to the characteristic construction noted above, in connecting the receiving pipe section to the inserted pipe section, the engaging projection of the inserted pipe section is inserted to the predetermined connecting position in the receiving pipe section through the annular wall portion of the receiving pipe section. The lock member fitted on the inserted pipe section to be freely rotatable and movable in the direction of pipe axis is adjusted to establish a particular phase where the engaging stopper portions agree with the attachment/detachment recesses formed in the annular wall portion of the receiving pipe section in the direction of pipe axis. The lock member is pushed into the receiving pipe section in this state. Then, the engaging stopper portions of the lock member are moved through the attachment/detachment recesses and placed between the annular wall portion of the receiving pipe section and the engaging projection of the inserted pipe section placed in the inserted and connected position. Subsequently, the lock member is rotated about the pipe axis from the attachment/detachment operating position corresponding to the attachment/detachment recesses to the predetermined attachment position corresponding to the inward surface of the annular wall portion.

In this state, the engaging stopper portions of the lock member face the inward surface of the annular wall portion of the receiving pipe section in the direction of pipe axis. Therefore, when a removing force is applied to both the pipe sections due to an earthquake or unequal settlement, the engaging projection of the inserted pipe section contacts the lock member from the direction of the pipe axis. Further, the engaging stopper portions of the lock member contact the inward surface of the annular wall portion of the receiving pipe section from the direction of pipe axis, thereby strongly preventing relative separation movement between the pipe sections.

In addition, since the lock member includes an extending portion projecting to the outside of the pipe section through between the inner peripheral surface of the annular wall portion of the receiving pipe section and the outer peripheral surface of the inserted pipe section, the lock member can be readily rotated and moved in the direction of pipe axis from the outside of the pipe section by utilizing the extending portion. The construction further includes the elastic urging member provided between the stopper wall portion formed in the inner peripheral surface of the receiving pipe section for limiting the maximum inserted position and the one side face of the engaging projection of the inserted pipe section, and the elastic urging member provided between the extending portion of the lock member and the outward surface of the annular wall portion, thereby allowing the engaging stopper portions of the lock member rotated to the predetermined attachment position to contact the inward surface of the annular wall portion by the elastic urging forces of both the elastic urging members. Therefore, the engaging stopper portions of the lock member are easily maintained in the predetermined attachment position even when an external force is applied.

Hence, the contact between the engaging projection of the inserted pipe section and the annular wall portion of the receiving pipe section through the lock member can reliably perform a strong separation preventive function, and at the same time the rotating operation of the lock member can switch between a locked state for preventing disengaging movement between the pipe sections and an unlocked state for allowing the removing and inserting movements between the pipe sections. Further, the lock member can be readily operated from the outside of the pipe through the extending portion thereof. As a result, the engaging and disengaging operations between the pipe sections can be carried out easily with reduced labor.

Moreover, the elastic urging members provided between the extending portion of the lock member and the outward surface of the annular portion of the receiving pipe section and provided between the stopper wall portion and the one side of the engaging projection, respectively, can maintain both the pipe sections in the predetermined attachment position for reliably achieving the function of strongly preventing separation of the pipe sections. Further, any clattering between the lock member and the receiving pipe section can be advantageously restrained.

A fourth characteristic feature of the present invention lies in further comprising a return preventive device for receiving, when the engaging stopper portions inserted into the receiving pipe section through the attachment/detachment recesses are rotated to the predetermined attachment position, the engaging stopper portions of the lock member in a position shifted to the removing side in the direction of pipe axis from a rotating operation passage, and for preventing the rotation or applying resistance to the rotation, in the receiving position, of the engaging stopper portions of the lock member toward the attachment/detachment operating position.

According to the characteristic construction noted above, when the engaging stopper portions of the lock member are inserted into the receiving pipe section through the attachment/detachment recesses formed in the annular wall portion of the receiving pipe section and then the lock member is rotated about the pipe axis from the attachment/detachment operating position corresponding to the attachment/detachment recesses to the predetermined attachment position, the return preventive device can receive the engaging stopper portions of the lock member rotated to the predetermined attachment position in the position shifted to the removing side in the direction of pipe axis from the rotating operation passage. This can prevent the rotation or applying resistance to the rotation of the engaging stopper portions of the lock member toward the attachment/detachment operating position.

Therefore, in the state where the engaging stopper portions of the lock member are received by the receiving device, an external force is required sufficient for rotating the engaging stopper portions of the lock member to the attachment/detachment operating position.

As a result, the strong separation preventive function can be reliably performed by the contact between the engaging projection of the inserted pipe section and the annular wall portion of the receiving pipe section through the lock member, while allowing the pipe sections to be assembled and disassembled efficiently and easily with reduced labor.

A fifth characteristic feature of the present invention lies in that the elastic urging member attached between the extending portion of the lock member and the outward surface of the annular wall portion of the receiving pipe section has a circular profile and a size capable of closing or substantially closing outward sides of the attachment/detachment recesses of the annular wall portion.

According to the characteristic construction noted above, by utilizing the elastic urging member provided for moving and urging the engaging stopper portions of the lock member to the side to contact the inward surface of the annular wall portion, the attachment/detachment recesses of the annular wall portion which are not required after both the pipe sections are assembled can be closed or substantially closed. As a result, any cover construction for preventing entry of foreign matters through the attachment/detachment recesses is dispensable or simplified.

A sixth characteristic feature of the present invention lies in that the lock member includes a plurality of split lock pieces divided in a circumferential direction to be fitted along the outer peripheral surface of the inserted pipe section.

According to the characteristic feature noted above, it is easy to carry out the operation for inserting the engaging stopper portions of the lock member between the annular wall portion of the receiving pipe section and the engaging projection of the inserted pipe section placed in the inserted and connected position through the attachment/detachment recesses and the operation for rotating the lock member about the pipe axis from the attachment/detachment operating position corresponding to the attachment/detachment recesses to the predetermined attachment position.

Further, the plurality of the split lock pieces can be fastened and fixed with the elastic urging member provided between the extending portion of the lock member and the outward surface of the annular wall portion.

A seventh characteristic feature of the present invention lies in that the extending portion of the lock member has a receiving surface for receiving the elastic urging member, formed as an inclined surface having a greater distance from the outward surface of the annular wall portion as it extends radially outward.

According to the characteristic construction noted above, when the elastic urging member is attached between the inclined receiving face formed in the extending portion of the lock member and the outward surface of the annular wall portion, the elastic restoring force of the elastic urging member in the diameter-decreasing direction can be efficiently converted to the urging force for allowing the engaging stopper portions of the lock member rotated to the predetermined attachment position to contact the inward surface of the annular wall portion. As a result, the engaging stopper portions of the lock member can be maintained reliably in the predetermined attachment position even if an external force is applied.

DETAILED DESCRIPTION OF THE PRESENT INVENTION

First Embodiment

Figure 1:
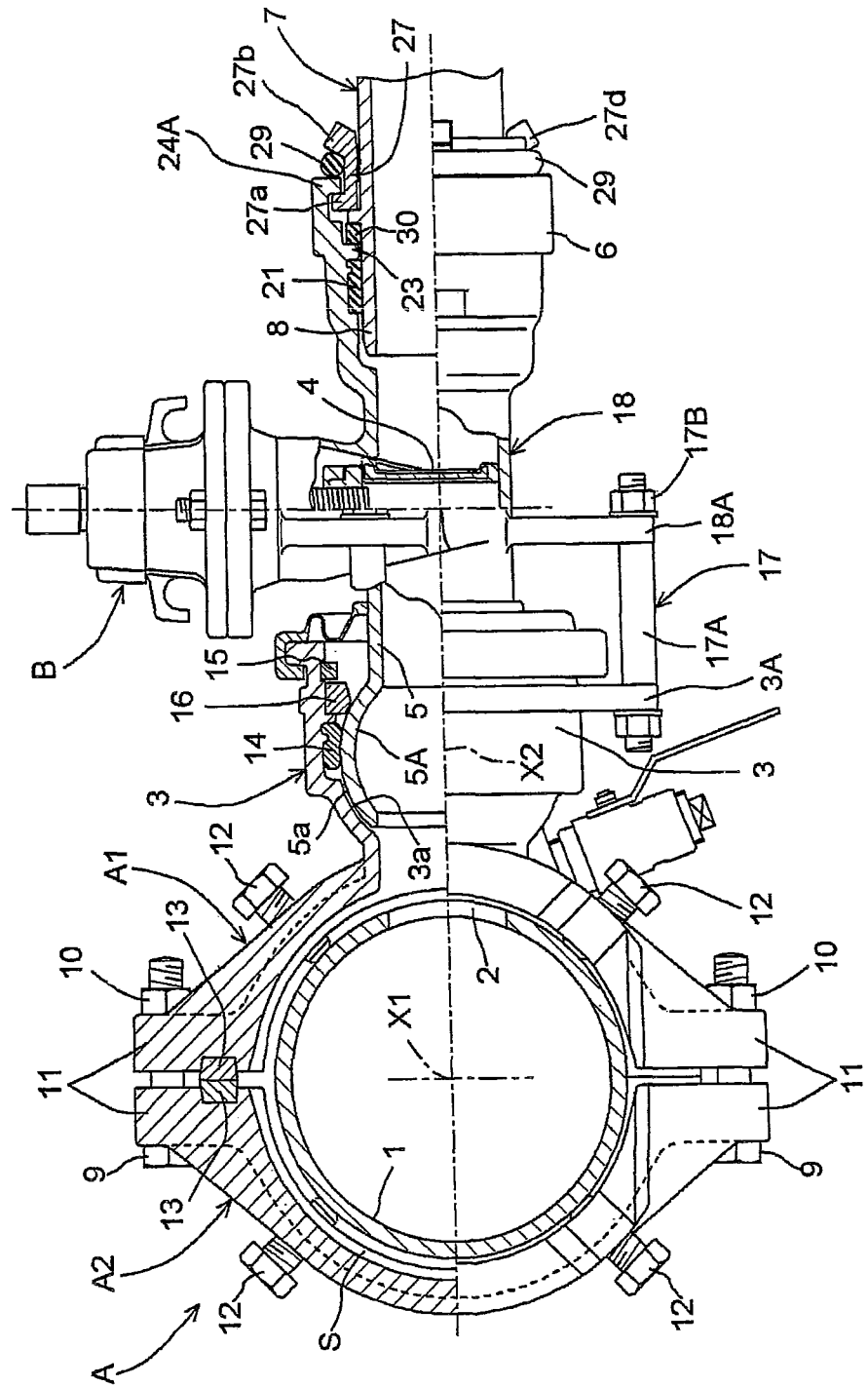
FIG. 1 is a partly cut away side view of a pipe joint construction showing a first embodiment of the present invention.
Figure 2:
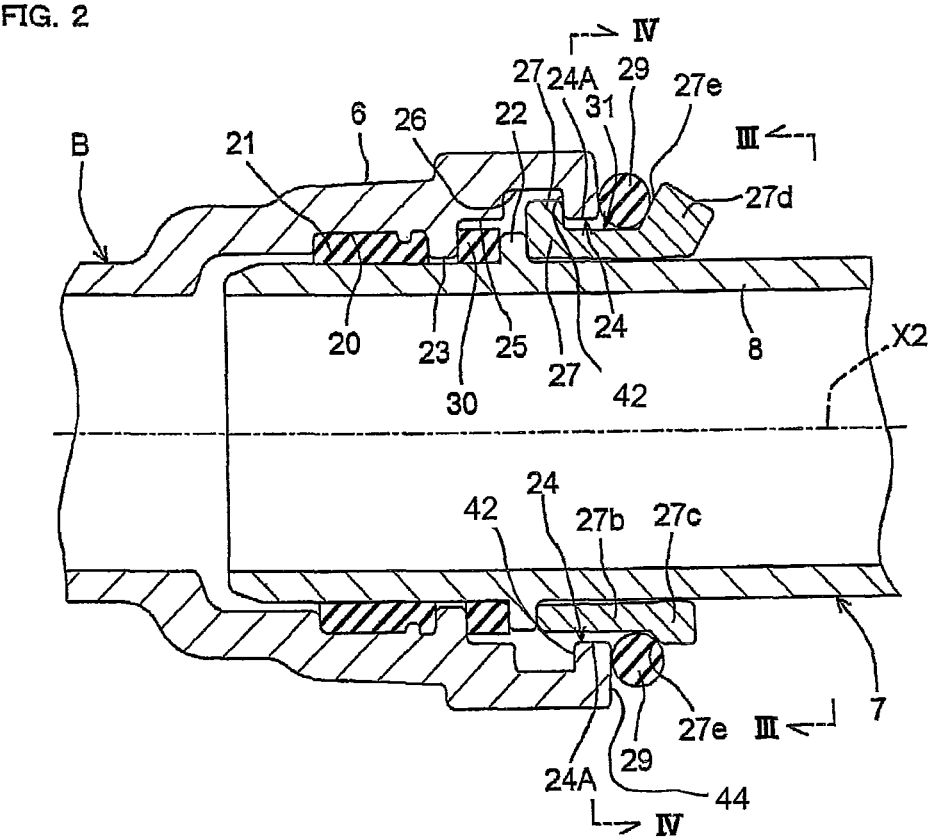
FIG. 2 is an enlarged sectional side view of the pipe joint construction of the present invention.
Figure 3:
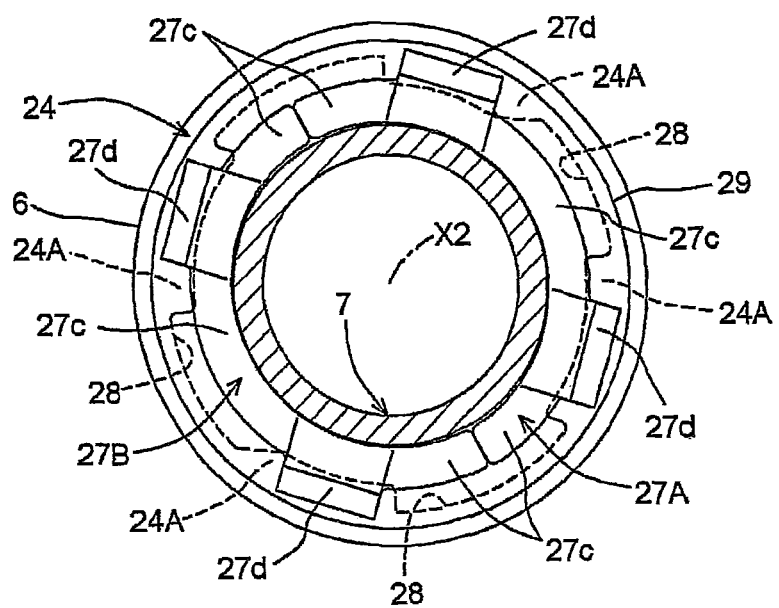
FIG. 3 is a section taken on line III-III in FIG. 2.
Figure 4:
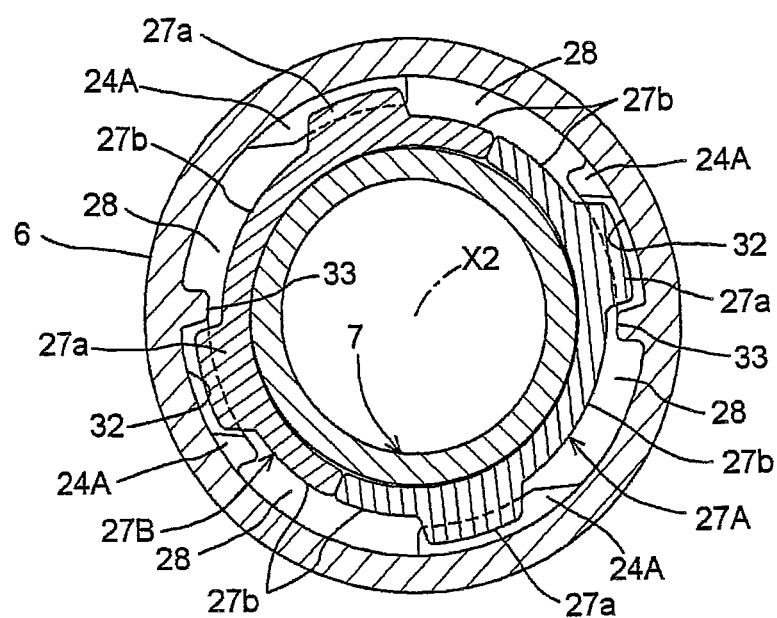
FIG. 4 is a section taken on line IV-IV in FIG. 2.
Figure 5:
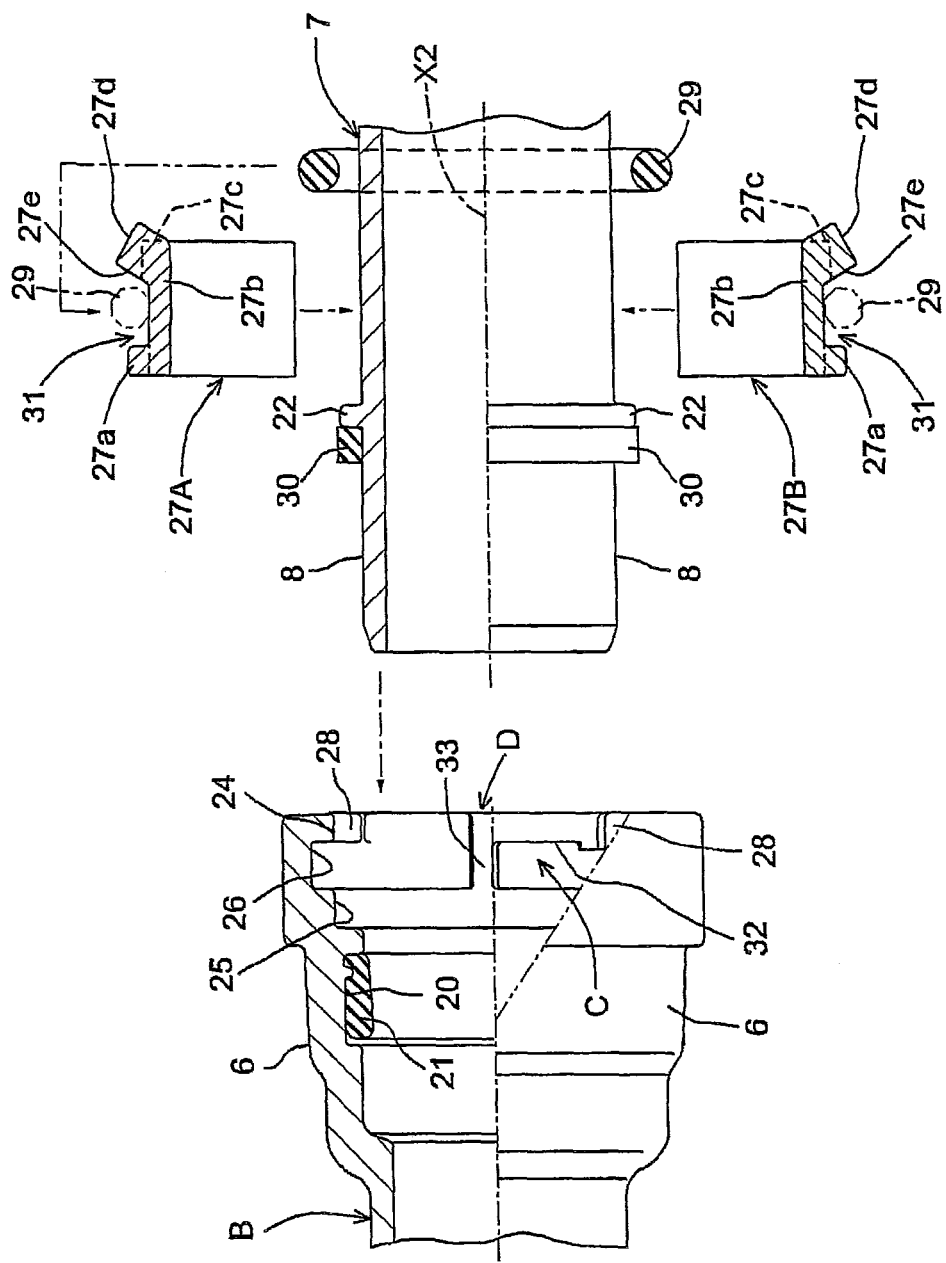
FIG. 5 is an exploded sectional side view.
Figure 6:
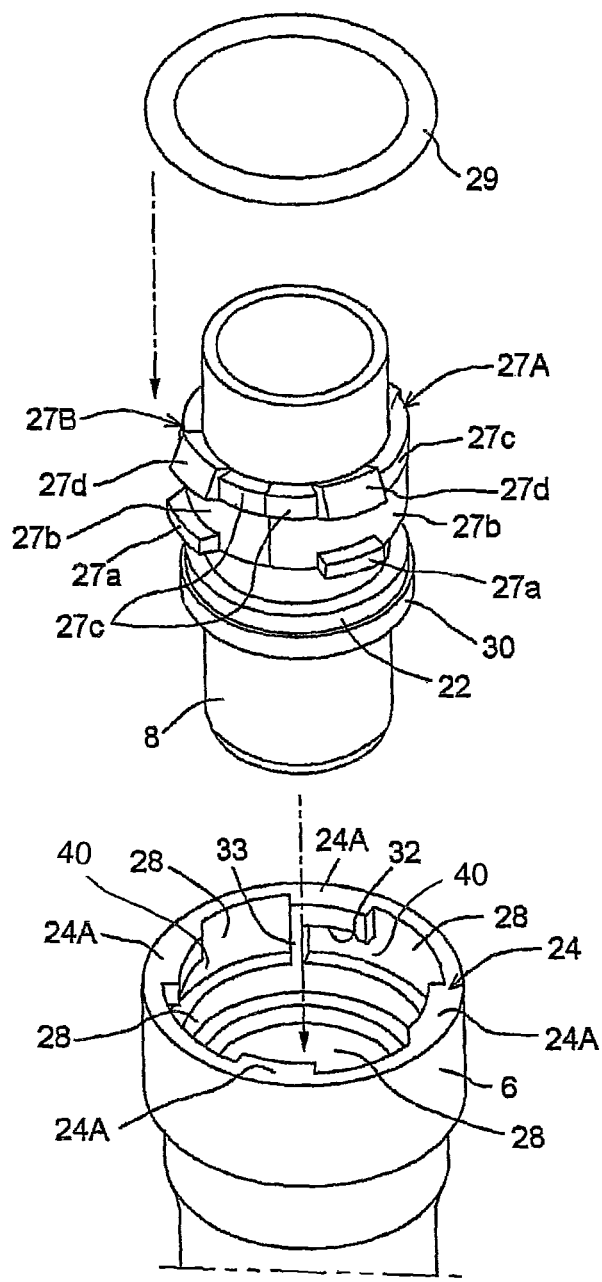
FIG. 6 is an exploded perspective view before connection.
Figure 7:
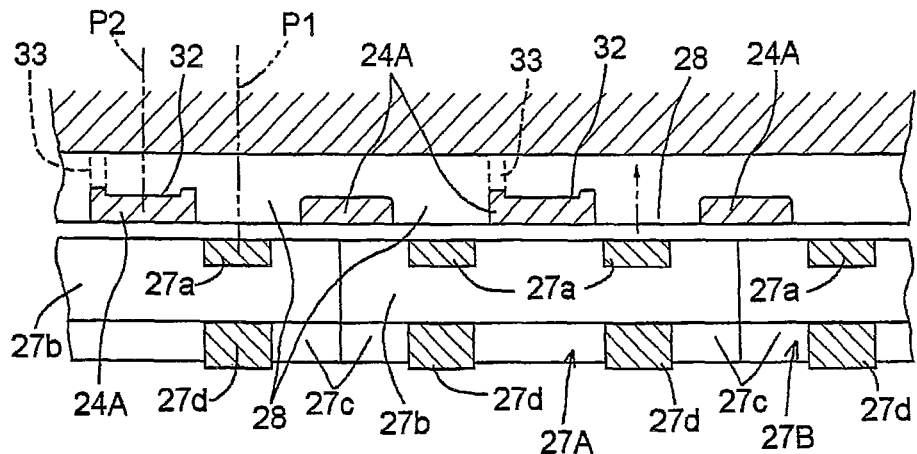
FIG. 7 is a development sectional view of a principal portion before connection.
Figure 8:
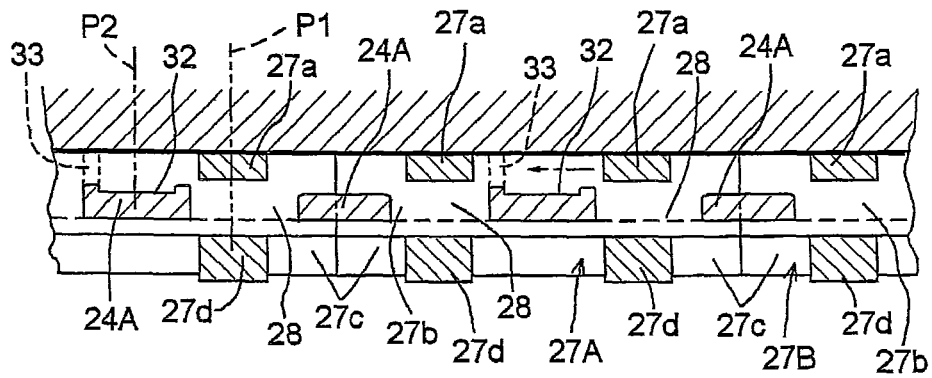
FIG. 8 is a development sectional view showing engaging stopper portions of a lock member placed in an attachment/detaching operating position.
Figure 9:
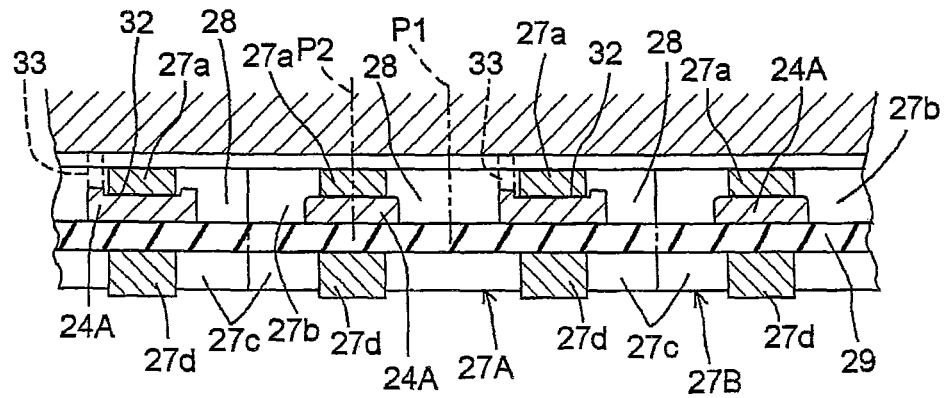
FIG. 9 is a development sectional view showing the engaging stopper portions of the lock member placed in a predetermined attachment position.

FIGS. 1 through 9 illustrate a pipe joint construction provided in a pipeline system of a water pipe 1 as one example of fluid pipes.

A cast-iron joint body A attached to the cast-iron water pipe 1 comprises two split joint segments A1 and A2 fitted on the water pipe 1 to be detachably and fixedly coupled to each other along a pipe peripheral direction (circumferential direction).

A branch receiving pipe section 3 protrudes outwardly and integrally from one of the split body segments A1 to communicate coaxially with a through bore 2 formed in a peripheral wall of the water pipe 1 from a direction of a second pipe axis X2 perpendicular to a direction of a first pipe axis X1 of the water pipe 1. An inserted pipe section 5 of a sluice valve B having a valve member 4 for opening and closing a branch fluid passage is hermetically fitted into and connected to the branch receiving pipe section 3 to be flexible in three-dimensional directions.

Further, the sluice valve B includes a receiving pipe section 6 to which an inserted pipe section 8 formed at one end of a branch pipe 7 is hermetically fitted and connected.

Each of the split joint segments A1 and A2 includes connecting flange portions 11 formed at circumferentially opposite ends thereof to integrally project radially outward therefrom for fixed connection through bolts 9 and nuts 10.

Each of the split joint segments A1 and A2 also includes bolts 12 screwed in opposite end regions thereof in the direction of the first pipe axis X1 and in two positions spaced apart from each other in the circumferential direction, for maintaining a predetermined space between an inner peripheral surface of the split joint segment A1 or A2 and an outer peripheral surface of the water pipe 1.

Further, first elastic seal member 13 made of synthetic rubber are fitted into and maintained in sealing grooves formed in each split joint segment A1 or A2 to hermetically seal between the joint segment and the outer peripheral surface of the water pipe 1 and between the connecting flange portions 11 of the split joint segments A1 and A2 adjacent to each other in the circumferential direction, respectively. This can prevent tap water (fluid) from leaking to the outside from the through bore 2.

An annular space S is formed between the inner peripheral surfaces of the split joint segments A1 and A2 and the outer peripheral surface of the water pipe 1 to be watertight (hermetically sealed) by the first elastic seal members 13 and communicating with the through bore 2. With this, when the fluid flows from the water pipe 1 into the annular space S through the through bore 2, a uniform pressure is applied to the inner surfaces of the two split joint segments A1 and A2, which maintains a contact pressure of each of the first elastic seal members 13 substantially uniform.

Next, a pipe joint construction between the branch receiving pipe section 3 of the split joint segment A1 and the inserted pipe section 5 of the sluice valve B will be described.

As shown in FIG. 1, the inserted pipe section 5 has one end portion 5A in the direction of the second pipe axis X2 formed to bulge diametrically outward to have a partially spherical shape.

The spherical portion 5A has a second slide-contact surface 5a formed on an outer peripheral surface thereof to have a partially spherical shape to slidably contact a first slide-contact surface 3a having a partially spherical shape and formed on an inner peripheral surface of the branch receiving pipe section 3 of the split joint segment A1.

The branch receiving pipe section 3 has an inside diameter for allowing the spherical portion 5A of the inserted pipe section 5 arranged coaxially with the second pipe axis X2 of the branch receiving pipe section 3 to be inserted and removed in the second pipe axis X2.

Further, an annular second elastic seal member 14 made of synthetic rubber, a slide-contact guide member 16 made of cast iron and a C-shaped retainer 15 are arranged on the inner peripheral surface of the branch receiving pipe section 3 of the split joint segment A1, in a region adjacent the opening and continuous from the first slide-contact surface 3a in slidable contact with the second slide-contact surface 5a of the inserted pipe section 5.

The second elastic seal member 14 hermetically seals (watertight) between opposite mating surfaces of the branch receiving pipe section 3 and the inserted pipe section 5. The slide-contact guide member 16 is provided to allow a third slide-contact surface slidably contacting the second slide-contact surface 5a of the inserted pipe section 5 to have a partially spherical shape. The retainer 15 prevents the slide-contact guide member 16 moving out.

A temporary fixing member 17 is provided, to be operable for fixing and releasing, between the branch receiving pipe section 3 and the sluice valve B for temporarily fixing the inserted pipe section 5 of the sluice valve B to the branch receiving pipe section 3 in a bent neutral position.

The temporary fixing member 17 includes connecting pieces 3A integrally projecting from a plurality of circumferential positions on the outer peripheral surface of the branch receiving pipe section 3.

The sluice valve B includes a valve casing 18 as one of the components integrally formed between the inserted pipe section 5 and the receiving pipe section 6. The valve casing 18 has connecting pieces 18A integrally projecting therefrom to face the connecting pieces 3A of the branch receiving pipe section 3 in the direction of the second pipe axis X2. Further, temporary fixing bolts 17A are inserted through the connecting pieces 3A and 18A facing each other in the direction of the second pipe axis X2. Nuts 17B screwed to opposite threaded end portions of the temporary fixing bolts 17A are fastened to temporarily fix the branch receiving pipe section 3 and the inserted pipe section 5 in the bent neutral position where the pipe axes thereof are aligned or substantially aligned.

It should be noted that the temporary fixation by the temporary fixing bolts 17A and nuts 17B is released after the pipe assembling operation for the branch pipeline system is completed.

Next, a pipe joint construction between the receiving pipe section 6 of the sluice valve B and the inserted pipe section 8 of the branch pipe 7 will be described.

As illustrated in FIGS. 1 through 6, the receiving pipe section 6 has an annular seal mounting groove 20 formed in an inner peripheral surface thereof for receiving a third elastic seal member 21 for sealing which is compressed between the receiving pipe section 6 and an outer peripheral surface of the inserted pipe section 8 inserted from the direction of the second pipe axis X2.

An annular stopper wall portion 23 is formed integrally with the inner peripheral surface of the receiving pipe section 6 in a position adjacent a receiving opening thereof continuous with the seal mounting groove 20 for contacting one side of an annular engageable projection 22 projecting integrally from the outer peripheral surface of the inserted pipe section 8 from the direction of the second pipe axis X2, thereby to limit a maximum inserted position of both the pipe sections 6 and 8.

An annular wall portion 24 is formed integrally with the inner peripheral surface of the receiving pipe section 6 at an end portion adjacent the receiving opening thereof to project radially inward to have an inside diameter allowing passage of the engageable projection 22 of the inserted pipe section 8.

A first circumferential groove 25 and a second circumferential groove 26 are formed in the inner peripheral surface of the receiving pipe section 6 in positions between the stopper wall portion 23 and the annular wall portion 24. The first circumferential groove 25 has the same or substantially the same inside diameter as the annular wall portion 24, while the second circumferential groove 26 has a larger inside diameter than the annular wall portion 24 and communicates with the first circumferential groove 25 at the receiving opening side thereof.

A cast-iron or steel lock member 27 is provided between the engageable projection 22 of the inserted pipe section 8 inserted into an inserted connecting position in the receiving pipe section 6 and the annular wall portion 24 of the receiving pipe section 6 for contacting the other side face of the engageable projection 22 of the inserted pipe section 8 from the direction of the second pipe axis X2. The lock member 27 is rotatable about the second pipe axis X2 and movable in the direction of the second pipe axis X2.

Engaging stopper portions 27a project integrally from a plurality of positions (four circumferential positions in the present embodiment) in the circumferential direction of the lock member 27 for contacting an inward surface 42 of the annular wall portion 24 of the receiving pipe section 6 from the direction of the second pipe axis X2, thereby to prevent relative disengaging movement between the connected pipe sections 6 and 8.

Attachment/detachment recesses 28 are formed in the annular wall portion 24 of the receiving pipe section 6 for allowing the engaging stopper portions 27a of the lock member 27 to be inserted and removed in the direction of the second pipe axis X2.

Therefore, when the receiving pipe section 6 is connected to the inserted pipe section 8, the engageable projection 22 of the inserted pipe section 8 is first allowed to pass through the annular wall portion 24 of the receiving pipe section 6 to be inserted into a predetermined connecting position within the pipe.

Next, the lock member 27 fitted on the inserted pipe section 8 to be rotatable and movable in the direction of the second pipe axis X2 is adjusted to establish a particular phase where each engaging stopper portion 27a agrees, in the direction of the second pipe axis X2, with each attachment/detachment recess 28 formed in the annular wall portion 24.

Then, the lock member 27 is pushed into the receiving pipe section 6 in this state, thereby to allow each engaging stopper portion 27a to pass through the attachment/detachment recess 28 to be positioned between the annular wall portion 24 and the engageable projection 22 placed in the inserted connecting position.

Subsequently, the lock member 27 is rotated about the second pipe axis X2 from an attachment/detachment operating position P1 corresponding to the attachment/detachment recesses 28 to a predetermined attachment position P2 corresponding to the inward surface 42 of the annular wall portion 24, i.e. retainer inward surfaces of retainer wall portions 24A formed between the adjacent attachment/detachment recesses 28.

In this state, each engaging stopper portion 27a faces the retainer inward surface of each retainer wall portion 24A in the direction of the second pipe axis X2. Therefore, when a removing force is applied to both the pipe sections 6 and 8 due to an earthquake or unequal settlement, the engaging projection 22 contacts the lock member 27 from the direction of the second pipe axis X2.

Further, each engaging stopper portion 27a contacts the retainer inward surface of each retainer wall portion 24A from the direction of the second pipe axis X2, thereby to strongly prevent relative disengaging movement between both the pipe sections 6 and 8.

Further, extending portions 27b project integrally from the lock member 27 to extend outside of the pipe between the inner peripheral surface of the annular wall portion 24 of the receiving pipe section 6 and the outer peripheral surface of the inserted pipe section 8.

A ring-shaped first elastic urging member 29 made of synthetic rubber is detachably attached to the extending portions 27b between a position outside the receiving pipe section 6 and an outward surface 44 of the annular wall portion 24 of the receiving pipe section 6 for moving and urging the engaging stopper portions 27a of the lock member 27 rotated about the second pipe axis X2 from the attachment/detachment operating position P1 corresponding to the attachment/detachment recesses 28 to the predetermined attachment position P2 corresponding to the inward surface 42 of the annular wall portion 24, toward the side to contact the inward surface 42 of the annular wall portion 24 of the receiving pipe section 6.

A ring-shaped second elastic urging member 30 made of synthetic rubber is detachably attached between the stopper wall portion 23 of the receiving pipe section 6 and one side face of the engageable projection 22 of the inserted pipe section 8 for moving and urging the engaging stopper portions 27a of the lock member 27 rotated about the second pipe axis X2 from the attachment/detachment operating position P1 corresponding to the attachment/detachment recesses 28 to the predetermined attachment position P2 corresponding to the inward surface 42 of the annular wall portion 24, toward the side to contact the inward surface 42 of the annular wall portion 24 of the receiving pipe section 6.

A return preventive device C is provided for receiving, when the engaging stopper portions 27a inserted into the receiving pipe section 6 through the attachment/detachment recesses 28 are rotated to the predetermined attachment position P2, the engaging stopper portions 27a in a position shifted to the removing side in the direction of the second pipe axis X2 from the rotating operation passage 40, and preventing the rotation or applying resistance to the rotation, in the receiving position, of the engaging stopper portions 27a toward the attachment/detachment operating position P1.

Further, a rotation preventive device D is provided for preventing the engaging stopper portions 27a inserted into the attachment/detachment operating position P1 through the attachment/detachment recesses 28, when rotated along the rotating operation passage 40 in the second circumferential groove 26, from being rotated further to be maintained in the predetermined attachment position P2.

The lock member 27 includes split lock pieces 27A and 27B split in half in the circumferential direction along the outer peripheral surface of the inserted pipe section 8 to be freely fitted thereon.

Each of the split lock pieces 27A and 27B has two engaging stopper portions 27a insertable into the second circumferential groove 26 through the attachment/detachment recess 28, and semi-cylindrical extending portion 27b extending outside the pipe through the annular wall portion 24 and the first elastic urging member 29, both of the engaging stopper portions and the extending portion being formed integrally with the split lock pieces.

At a projecting end portion of the extending portion 27b are integrally formed small-diameter boss portions 27c projecting radially outward to a small extent, and large-diameter boss portions 27d projecting radially outward to a large extent.

Further, the small-diameter boss portions 27c and the large-diameter boss portions 27d have receiving surfaces 27e, respectively, defining with the outward surface 44 of the annular wall portion 24 an attachment recess 31 for the first elastic urging member 29. Each receiving surface is an inclined surface to have a greater distance from the outward surface 44 of the annular wall portion 24 as it extent radially outward.

The first elastic urging member 29 is attached, with a diameter increased against its elastic restoring force, to the attachment recess 31 formed between the inclined receiving faces 27e of the split lock pieces 27A and 27B and the outward surface 44 of the annular wall portion 24. In this state, the elastic restoring force of the first elastic urging member 29 acting to decrease its diameter is efficiently converted to an urging force for allowing the engaging stopper portions 27a rotated to the predetermined attachment position P2 to contact the inward surface 42 of the annular wall portion 24 of the receiving pipe section 6. As a result, the engaging stopper portions 27a of the lock member 27 can be maintained in the predetermined attachment position P2 reliably.

The first elastic urging member 29 has an inside diameter smaller than a minimum outside diameter of the outer peripheral surface of the extending portions 27b in an unloaded condition. The first elastic member 29 has an outside diameter larger than the inside diameter of the attachment/detachment recesses 28 so as to close or substantially close and stop the outer side portions of the attachment/detachment recesses 28 of the annular wall portion 24 when attached to the attachment recess 31.

In the return preventive device C, each engaging stopper portion 27a has a circumferential width smaller than a circumferential width of each retainer wall portion 24A, between adjacent attachment/detachment recesses 28, of the annular wall portion 24.

Further, the return preventative device C includes a pair of retainer wall portions 24A facing each other in the radial direction across the second pipe axis X2 and having engaging recesses 32 formed in the inward surfaces thereof for receiving the engaging stopper portions 27a placed in the predetermined attachment position P2 of the rotating operation passage 40, in a position where part of the engaging stopper portions 27a are shifted to the removing side in the direction of the second pipe axis X2 from the rotating operation passage 40.

One end portion of circumferentially opposite ends of the engaging recess 32 adjacent the attachment/detachment recess 28 is steeply inclined so as to prevent the engaging stopper portion 27a from being rotated to the attachment/detachment operating position P1 or apply a great resistance to the rotation of the engaging stopper portion in the receiving position to be engaged in the attachment/detachment recess 28.

The rotation preventive device D includes a rotation preventive wall portion 33 formed integrally with the inner peripheral surface of the second circumferential groove 26 of the receiving pipe section 6 in a position continuing with the deep end side of the engaging recess 32 formed in the retainer wall portion 24A, for contacting one circumferential end portion of each engaging stopper portion 27a when the engaging stopper portion 27a is rotated to the predetermined attachment position P2 along the rotating operation passage 40 in the second circumferential groove 26.

Each engaging stopper portion 27a comes into contact with the rotation preventive wall portion 33 when rotated to the predetermined attachment position P2 along the rotating operation passage 40 in the second circumferential groove 26, and prevents further rotation. At the same time, each engaging stopper portion 27a moves toward the removing side in the direction of the second pipe axis P2 from the rotating operation passage 40 under the elastic restoring force of the second elastic urging member 30, to engage the engaging recess 32 of the return preventive device C formed in the removing side. Thus, each engaging stopper portion 27a can be urged to and maintained in the receiving position displaced from the rotating operation passage 40 to the removing side.

As a result, each engaging stopper portion 27a placed in the predetermined attachment position P2 is restrained from moving toward the rotating operation passage 40 even if an external force is applied.

Therefore, the engaging projection 22 of the inserted pipe section 8 is brought into contact with the annular wall portion 24 through the lock member 27, thereby reliably performing a separation preventive function, and at the same time allowing the pipe sections 6 and 8 to be assembled and disassembled efficiently and easily with reduced labor.

Further, since the extending portion 27b protrudes from the lock member 27, the lock member 27 can be rotated and moved in the direction of pipe axis from outside the pipe by utilizing the extending portion 27b.

Further, the second elastic urging member 30 and the first elastic urging member 29 allow each engaging stopper portion 27a rotated to the predetermined attachment position P2 to contact the retainer inward surface of each retainer wall portion 24A by the elastic urging force of both the elastic urging members 29 and 30. Thus, each engaging stopper portion 27a of the lock member 27 can be maintained in the predetermined attachment position even if an external force is applied.

Second Embodiment

In the first embodiment described above, the engaging projection 22 is formed to project integrally from the outer peripheral surface of the inserted pipe section 8, and the lock member 27 consists of the split lock pieces 27A and 27B. The split lock pieces 27A and 27B are attached to the outer peripheral surface of the inserted pipe section 8 from radially outward, but other constructions may be employed.

Figure 10:
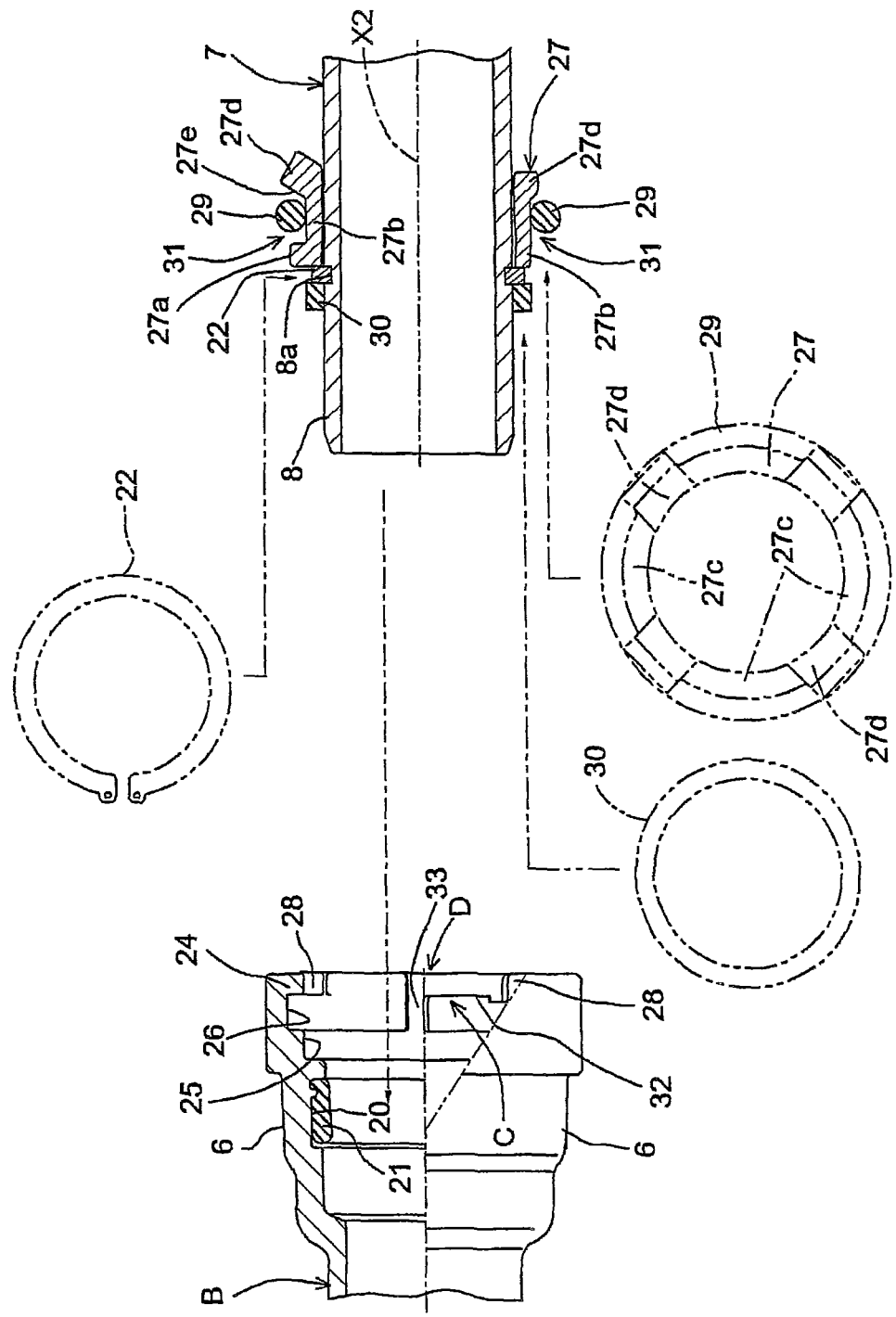
FIG. 10 is an exploded sectional side view showing a second embodiment of the present invention before connection.

As shown in FIG. 10, for example, the lock member 27 may have an annular integral construction, while a generally C-shaped engaging projection 22 which is elastically deformable in a diameter-increasing direction may be detachably attached to a mounting groove 8a formed in the outer peripheral surface of the inserted pipe section 8. The lock member 27 may be attached to the outer peripheral surface of the inserted pipe section 8 from the direction of pipe axis.

Since the other aspects of the construction are the same as those described in the first embodiment, like reference numerals are affixed to like components, and are not described.

Third Embodiment

In the first embodiment described above, the second elastic urging member 30 is provided between the stopper wall portion 23 of the receiving pipe section 6 and one side face of the engaging projection 22 in a slightly compressed condition when both the pipe sections 6 and 8 are in a predetermined connected condition. Also, the first elastic urging member 29 is provided between the receiving faces 27e of the lock member 27 and the outward surface of the annular wall portion 24 in a slightly compressed condition. Thus, both the pipe sections 6 and 8 are connected to each other not to be substantially extendible and contactable along the second pipe axis P2. However, other constructions may be employed.

Figure 11:
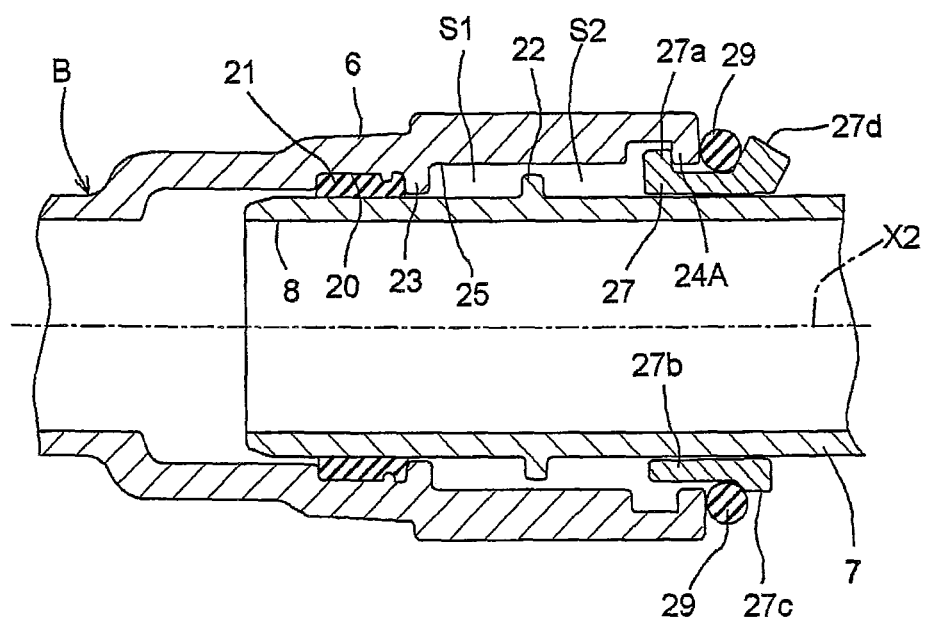
FIG. 11 is a sectional side view of a principal portion showing a third embodiment of the present invention.

As shown in FIG. 11, for example, the second elastic urging member 30 may be omitted, and spaces S1 and S2 corresponding to extending/contracting operation distances between the pipe sections 6 and 8 may be formed between the stopper wall portion 23 and one side face of the engaging projection 22, and between the other side face of the engaging projection 22 of the inserted pipe section 8 and the lock member 27, respectively.

Since the other aspects of the construction are the same as those described in the first embodiment, like reference numerals are affixed to like components, and are not described.

Other Embodiments (1) In the first embodiment described above, the lock member 27 consists of the split lock pieces 27A and 27B circumferentially split in half, but a different construction may be employed. For example, the lock member may have three or more split lock pieces which are divided in the circumferential direction.

(2) In the first embodiment described above, the technique of the present invention is applied to the pipe joint construction between the receiving pipe section 6 of the sluice valve B and inserted pipe section 8 formed at one end portion of the branch pipe 7, but may be applied to other constructions. For example, the technique of the present invention may be applied to the pipe joint construction between the branch receiving pipe section 3 of the joint segment A1 and the inserted pipe section 5 of the sluice valve B.

(3) In the first embodiment described above, the first elastic urging member 29 is provided between the extending portion 27b and the outward surface of the annular wall portion 24 to have an annular shape capable of closing or substantially closing the outward sides of the attachment/detachment recesses 28 of the annular wall portion 24, but other constructions may be employed.

For instance, there are cases where the first elastic urging member 29 cannot close the outward sides of the attachment/detachment recesses 28 or can close only part of the outward sides of the attachment/detachment recesses 28. In such cases, lids for closing the outward sides of the attachment/detachment recesses 28 or plugs fitted to the attachment/detachment recesses 28 may be formed on or attached to portions corresponding to the attachment/detachment recesses 28 of the first elastic urging member 29.

The present invention may be applied to a pipe joint construction provided in a pipeline system of fluid pipes, e.g. a pipe joint construction comprising a receiving pipe section constituting part of a fluid pipeline system of a water pipeline system or the like, and an inserted pipe section inserted and connected thereto from a pipe axis direction.

The invention claimed is:

1. A pipe joint construction comprising:
an engaging projection integrally formed in an outer peripheral surface of an inserted pipe section, the inserted pipe section inserted into and connected to a receiving opening end of a receiving pipe section in a direction of a pipe axis, the engaging projection passing through an annular wall portion which is formed in the receiving opening end of the receiving pipe section and which projects radially inward toward the pipe axis;
an elastic seal member attached to an annular seal mounting groove formed in an inner peripheral surface of the receiving pipe section, the elastic seal member configured to be compressed between the inner peripheral surface of the receiving pipe section and the outer peripheral surface of the inserted pipe section at a position closer to a distal end of the inserted pipe section than a position where the engaging projection is formed;
a stopper wall portion formed on an inner peripheral surface of the receiving pipe section for contacting a second side of the engaging projection of the inserted pipe section in the direction of the pipe axis, thereby limiting a maximum inserted position;
a lock member configured to contact a first side of the engaging projection of the inserted pipe section in the direction of the pipe axis, the first side being closer to the receiving opening end of the receiving pipe section than the second side of the engaging projection, the lock member relatively rotatable attachable between the annular wall portion of the receiving pipe section and the engaging projection of the inserted pipe section when the inserted pipe section is inserted into the receiving pipe section, the lock member comprising a plurality of split lock pieces each including engaging stopper portions projecting therefrom for contacting an inward surface of the annular wall portion of the receiving pipe section in the direction of the pipe axis, thereby preventing relative disengaging movement between the connected pipe sections;
attachment/detachment recesses framed in the annular wall portion of the receiving pipe section for allowing inserting and removing movements of the engaging stopper portions of the lock member in the direction of the pipe axis when the inserted pipe section is inserted into and removed from the receiving pipe section;
a first elastic urging member provided in an attachment recess formed between a receiving surface of a boss portion of each of the plurality of split lock pieces of the lock member and an outward surface of the annular wall portion of the receiving pipe section, the boss portion positioned at an end of the lock member which is outside of the receiving pipe section and extends away from the receiving pipe section, the receiving surface of the boss portion and the outward surface of the annular wall portion being opposed to each other in the direction of the pipe axis, the first elastic urging member being in direct contact with the receiving surface of the boss portion of each of the plurality of split lock pieces of the lock member in the direction of the pipe axis and with the outward surface of the annular wall portion of the receiving pipe section in the direction of the pipe axis such that the first elastic urging member is positioned between the receiving surface of the boss portion of each of the plurality of split lock pieces of the lock member and the outward surface of the annular wall portion of the receiving pipe section; and a second elastic urging member provided in a circumferential groove formed on an inner peripheral surface of the receiving pipe section between the stopper wall portion of the receiving pipe section and the second side of the engaging projection of the inserted pipe section, the second elastic urging member being in direct contact with the stopper wall portion in the direction of the pipe axis and with the second side of the engaging projection of the inserted pipe section in the direction of the pipe axis, wherein the engaging stopper portions of the lock member are in direct contact with the first side of the engaging projection in the direction of the pipe axis and in direct contact with the inward surface of the annular wall portion in the direction of the pipe axis when the inserted pipe section is inserted into and connected to the receiving pipe section, and the first and second elastic urging members each move and urge the engaging stopper portions of the lock member toward the inward surface of the annular wall portion of the receiving pipe section in the direction of the pipe axis when the lock member is rotated about the pipe axis from an attachment/detachment operating position corresponding to the attachment/detachment recesses to a predetermined attachment position, such that urging forces produced by the first and second elastic urging members causes the engaging stopper portions to contact the inward surface of the annular wall portion of the receiving pipe section.

2. The pipe joint construction of claim 1, further comprising a return preventive device for receiving the engaging stopper portions of the lock member in a position shifted to a removing side in the direction of the pipe axis from a rotating operation passage when the engaging stopper portions are inserted into the receiving pipe section through the attachment/detachment recesses and are rotated to the predetermined attachment position, and for preventing the rotation or applying resistance to the rotation, in the receiving position, of the engaging stopper portions of the lock member toward the attachment/detachment operating position.

3. The pipe joint construction of claim 1, wherein the first elastic urging member attached between the receiving surface of the boss portion of the lock member and the outward surface of the annular wall portion of the receiving pipe section has a circular profile and a size capable of closing or substantially closing outward sides of the attachment/detachment recesses of the annular wall portion.

4. The pipe joint construction of claim 1, wherein the plurality of split lock pieces are divided in a circumferential direction to be fitted along the outer peripheral surface of the inserted pipe section.

5. The pipe joint construction of claim 1, wherein the receiving surface is formed as an inclined surface having a greater distance from the outward surface of the annular wall portion as it extends radially outward.

* * * * *

UNITED STATES PATENT AND TRADEMARK OFFICE
CERTIFICATE OF CORRECTION

PATENT NO.        : 8,632,104 B2                                          Page 1 of 1
APPLICATION NO.   : 11/795397
DATED             : January 21, 2014
INVENTOR(S)       : Horikawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this
Twenty-second Day of September, 2015

Michelle K. Lee
*Director of the United States Patent and Trademark Office*